(12) United States Patent
Truong (10) Patent No.: US 7,359,592 B2
(45) Date of Patent: Apr. 15, 2008

(54) SINGLE FIBER LINKS FOR FULL DUPLEX AIRCRAFT DATA NETWORK

(75) Inventor: Tuong Kien Truong, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/277,092

(22) Filed: Mar. 21, 2006

(65) Prior Publication Data

US 2007/0237452 A1    Oct. 11, 2007

(51) Int. Cl.
*G02B 6/28* (2006.01)
*H04B 10/24* (2006.01)
*H04J 14/00* (2006.01)
*H04B 10/20* (2006.01)

(52) U.S. Cl. .................... 385/24; 398/42; 398/48; 398/58; 398/68

(58) Field of Classification Search ............... 385/24; 398/41, 42, 45–51, 58–73, 143
See application file for complete search history.

(56) References Cited

U.S. PATENT DOCUMENTS

| | | | |
|---|---|---|---|
| 5,108,167 A | 4/1992 | Kandpal et al. | |
| 5,138,675 A | 8/1992 | Schofield | |
| 5,963,349 A | 10/1999 | Norte | |
| 6,201,908 B1 | 3/2001 | Grann | |
| 7,184,661 B1 * | 2/2007 | Usuba et al. ............... 398/46 |
| 2004/0057253 A1 | 3/2004 | DeCusatis et al. | |
| 2004/0175077 A1 | 9/2004 | Weber | |
| 2005/0254822 A1 | 11/2005 | Duncan et al. | |
| 2006/0051030 A1 | 3/2006 | Lee et al. | |

OTHER PUBLICATIONS

International Search Report for PCT/US2007/006925; Sep. 11, 2007; 12 pages.
Moisel, J. et al.; Optical Backplane for Avionic Applications Using Polymer Multimode Waveguides; IEEE Annual Meeting Conference Proceedings; vol. 2; 2000; pp. 567-568.

* cited by examiner

*Primary Examiner*—Michelle R. Connelly-Cushwa
*Assistant Examiner*—Rhonda S. Peace
(74) *Attorney, Agent, or Firm*—Armstrong Teasdale LLP (57) ABSTRACT

A method for creating a full duplex fiber optic network using one single fiber optic cable of the multimode fiber type for simultaneous transmission and reception is described. The method includes the steps of equipping end user devices and switches with bidirectional transceivers utilizing multi-frequency lasers, allocation of wavelengths to the end user devices to assure interoperability of redundant systems, and connecting the elements with multimode fiber optic cable. The network components include multi-frequency bidirectional transceivers, switches, and multimode fiber optic cable. This full duplex fiber optic network can be created as a single-backbone network or multiple-backbone network operating in series or in parallel to provide backup redundancy. Various embodiments are disclosed to show the versatility and scalability of the network.

22 Claims, 7 Drawing Sheets

SINGLE FIBER LINKS FOR FULL DUPLEX AIRCRAFT DATA NETWORK

BACKGROUND OF THE INVENTION

This invention relates generally to fiber optic networks, and more specifically, to full duplex fiber optic networks that utilize a single multimode fiber optic cable and employ a network architecture that allows for redundancy by creating multiple network backbones operating in parallel or parallel paths on a single network backbone.

Fiber optics provide many technical advantages in terms of weight, volume, power, bandwidth, future proofing (speed and protocol independence), safety (electrically passive, not an ignition source), and is the preferred solution for higher level Electromagnetic Interference and lightning environments in a composite aircraft. However, high component cost and special installation/maintenance burdens of avionic fiber optic components limit its deployment only to where very high-speed communication links are required. Currently each avionic fiber optic data link requires two fiber optic cables, one fiber optic cable for transmitting data and one fiber optic cable for receiving data with both fiber optic cables using the same optical wavelength. In addition, each data link requires many expensive aircraft-grade connectors for production breaks and wiring integration.

There are two main types of fiber optic cables: single-mode and multimode. Single-mode fiber optic cable has a core diameter of 9 µm and only supports a single light propagation mode. Multimode fiber optic cable has a core diameter of 62.5 µm and supports multiple propagation modes. Due to its small core, single-mode fiber optic cable is very susceptible to mechanical misalignment from vibration, shock and thermal excursion. It is also more susceptible to contamination from moisture, dust, a variety of fluids, and fiber endface micro cracks/pits etc. The harsh environmental conditions experienced on aircraft dictate the use of multimode fiber optic cable and optical connectors, which have wider alignment tolerances, in order to be economical and safe.

The term single fiber optic cable should not be confused with single-mode fiber optic cable. A single fiber optic cable bidirectional link means a single strand of fiber optic cable is used to simultaneously support both the transmission and receivership of data in opposing directions. Currently within the telecom industry, this is done almost exclusively with single-mode fiber optic cable.

Bidirectional transceivers are designed to transmit laser light at one wavelength and receiver laser light at a different wavelength than the transmit wavelength. For example, a common wavelength set for bidirectional transceivers could be to have the end user device transmit and receive at wavelengths of 1550 nm and 1310 nm, respectively, and have the switch to which the end user device is connected transmit and receive at wavelengths of 1310 nm and 550 nm, respectively.

Bidirectional transceivers using two different wavelengths for transmitting and receiving data on the same fiber optic cable can eliminate 50% of the fiber optic cable, optical termini, and optical connectors. However, commercial bidirectional transceivers that are affordable due to mass-market volume are designed for the long distance telecom market. These COTS (Commercial Off The Shelf) bidirectional transceivers are configured for use with single-mode fiber optic cable that is typically 2 km to 20 km in length. These bidirectional transceivers come in many varieties including, but not limited to, point-to-point, point-to-multipoint, single frequency laser, and multi-frequency lasers. There are some custom prototype bidirectional transceivers configured for multimode fiber optic cable, but these are not mainstream, and therefore not only expensive and not regulated by industry standards, but also not viable for the long term avionics market.

The other type of laser commonly used in the telecom market is the DFB (Direct Feedback) laser, which not only is more expensive but possesses a single frequency and therefore is not particularly suitable for multimode fiber optic cable applications. Use of a single laser mode (single spectral peak) like that of a DFB laser can excite just a few dominant lower-order propagation modes in a multimode fiber. Theoretically, any two modes can interfere destructively and result in significant power loss. The optical power variation penalty due to the effects of multi laser mode hopping, propagation mode cancellation, and differential mode delay may have significant impact on ultra high speed and very long distance telecom networks, but not on aircraft communication networks. Not only does the short aircraft fiber optic cable have more link budget and higher sensitivity when used with multi-frequency VCSEL (Vertical Cavity Surface Emitting Laser) and FP (Fabry Perot) lasers, but the modal fluctuation dynamic occur at a much faster rate than the overall data pulse width, and therefore the aggregated effect is insignificant.

One skilled in the art may point out another problem with using multimode fiber optic cable is that the Gigabit Ethernet standard requires the use of a special mode-conditioning patchcord for multimode fiber optic cable when transceivers designed for single-mode fiber optic cable are used. The patchcord is a special adaptor that fuses a segment of multimode fiber optic cable and a segment of single-mode fiber optic cable together with the single mode fiber slightly offset from the center of the multimode fiber to excite more propagation modes in the multimode fiber. The patchcord requires the use of two separate fiber optic cables for transmitting and receiving data since the patchcord only works in the transmit direction. The patchcord does not work in the receiving direction since a great deal of optical power is lost in transitioning from the larger multimode fiber optic cable to the smaller single-mode fiber optic cable. Mode conditioning patchcords are therefore used with separate transmit and receive fiber optic cables and are not suitable for single fiber optic cable applications.

Others skilled in the art would likely point out that variations in connector losses are caused by under-filled multimode fiber optic cables where the core modes may migrate off to one side or quadrant (cross section) of the fiber optic cable. If this quadrant is slightly offset in the butt-joint connector, then a significant amount of the optical signal may be lost. This can be a major problem with single mode fiber optic cable where the cable diameter is only 9 µm. However, the mode selective loss due to connector offset is insignificant for multimode fiber optic cable. Published measurement of over 3,000 multimode fiber optic cable connectors from different suppliers indicate a mean offset of 3 µm, which is small compared to the 62.5 µm core diameter.

BRIEF DESCRIPTION OF THE INVENTION

In one aspect, a network for providing redundant, full duplex, communications is provided. The network comprises a first network end device, a second network end device, a plurality of complimentary, bi-directional, transceiver pairs, and a plurality of multimode optical fibers optically coupled to the transceiver pairs. A first transceiver pair is communicatively coupled respectively to the first and the second network end devices to form a first separate network portion. A second transceiver pair is also communicatively coupled respectively to the first and the second network end devices to form a second separate network portion. The transceiver pairs are configured for single mode operation. The plurality of multimode optical fibers are configured for full duplex communication and optically coupled to the transceiver pairs to provide the communicative coupling therebetween, and each multimode optical fiber forms at least a portion of a separate network portion between respective transceiver pairs.

In another aspect, a method for fabricating a full duplex, redundant optical network is provided. The method comprises providing a plurality of network end devices, each network end device having a pair of complimentary, bidirectional optical transceivers and connecting, using multimode fiber optic cable, the transceivers of each network end device to separate network switches, each network switch configured with at least one pair of complimentary, bidirectional optical transceivers. The method further includes interconnecting, using multimode fiber optic cable, at least a portion of the non-connected transceivers in the network switches, to provide at least two separate, redundant networks for communications between the network end devices.

In still another aspect, an optical network backbone is provided that comprises a plurality of multimode optical fibers and a plurality of network switches. Each network switch includes a plurality of bi-directional, transceivers. At least one of the transceivers in each network switch is operable for bi-directional communication with a network end device, and at least one of the transceivers is operable for bi-directional communication with another of the network switches. Each transceiver is operable to transmit at a first wavelength and receive at a second wavelength.

In yet another aspect, an optical communications network is provided that comprises a plurality of network end devices, a plurality of network switches, and a plurality of multimode optical fibers. A portion of the network end devices are configured to operate as redundant systems, and each network end device includes a bi-directional optical transceiver configured to transmit at a first wavelength and receive at a second wavelength. Each network switch comprises a bi-directional optical transceiver configured to transmit at a first wavelength and receive at a second wavelength. The transceivers are all configured for single mode operation. The plurality of multimode optical fibers are configured for full duplex communication. A portion of the optical fibers optically couple a portion of the network switches to the network end devices, and a portion of the optical fibers optically couple a portion of the network switches to one another. The bi-directional optical transceivers are allocated by transmission and reception wavelengths to ensure interoperability of redundant systems of the network end devices.

DETAILED DESCRIPTION OF THE INVENTION

Various embodiments are described more fully below with reference to the accompanying drawings, which form a part hereof, and which show specific exemplary and alternate embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. The following detailed description is, therefore, not to be taken in a limiting sense.

The described embodiments establish methods for taking full advantage of fiber optic capabilities by operating with multiple wavelengths in parallel on a single fiber optic cable for full duplex, switched Ethernet, fiber optic networks used on aircraft and in other applications. The described embodiments have also made practical wavelength division multiplexing on multimode fiber optic cable and further provides significant savings in part cost, fabrication, assembly, handling, inventory, installation, inspection, and maintenance.

The embodiments utilize of common "off the shelf" multi-frequency bidirectional transceivers designed for use with single-mode fiber optic cable by facilitating their use with short-lengths of multimode fiber optic cable typically found on aircraft without utilization of mode conditioning patch cords. At these fiber optic cable lengths, chromatic dispersion and modal dispersion (pulse elongation) contributions are just a small percentage of the Bit Error Rate (less than 1E-10 e.g. one error in 10 Billion data bits). One specific aircraft topology described herein includes 10 in-line connectors and multimode fiber optic cable segments 200 m in length.

Aircraft data networks require redundancy to ensure system availability. Herein described are methods and systems that provide allocations of complimentary dual-wavelength bidirectional transceivers for the redundant network channels and redundant computers/controllers (end systems or end devices). The allocations are in such a manner as to provide convenient logistics for network switch-to-switch backbone connections, and switch-to-end user device connections while observing the safety separation requirements and system interoperability for airborne redundant networks.

Commercial off the shelf (COTS) multi-frequency bidirectional transceivers used in fiber optic networks use either a multi-frequency laser or a single-frequency laser. The multi-frequency laser diodes are of the type including, but not limited to, Fabry Perot (FP) and Vertical Cavity Surface Emitting Laser (VCSEL). High performance single-frequency Distributed Feedback lasers (DFB) while not only more expensive, are less reliable and susceptible to modal noise when used with multimode fiber optic cable. While multi-frequency bidirectional transceivers are generally designed to operate with a single-mode fiber optic cable, by using multimode fiber optic cable a greater amount of the optical power is captured and therefore improves the system link margin.

A single-frequency DFB laser excites a single propagation mode into a single-mode fiber optic cable. Single-frequency DFB lasers excite few low-order propagation modes into the center of a multimode fiber optic cable. Possible destructive interference among these modes can result in amplitude variation (mode partition noise). The multi-frequency FP and VCSEL lasers, on the other hand, have the ability to excite multiple (e.g., many thousands) propagation modes into a multimode fiber optic cable, where the destructive interference of any two modes excited by multi-frequency lasers is very small compared to the thousands of modes in totality. The method of coupling the laser to the multimode fiber optic cable is not a critical component of network construction, since the interference only has a small net effect.

For retrofitting existing fiber optic applications that utilize dual fibers, the multi-frequency bidirectional transceiver selected for various applications are of the type having a small form factor (SFF package) that is "drop-in" replaceable to conventional transceivers that use dual fiber optic cables. These "drop-in" replaceable transceivers would require no circuit board or interface modifications and/or redesigns. The extra fiber optic cable can now be removed or left in place to serve as extra fiber optic cable for future expansion and/or replacement in the event of fiber optic cable breakage.

Figure 1:
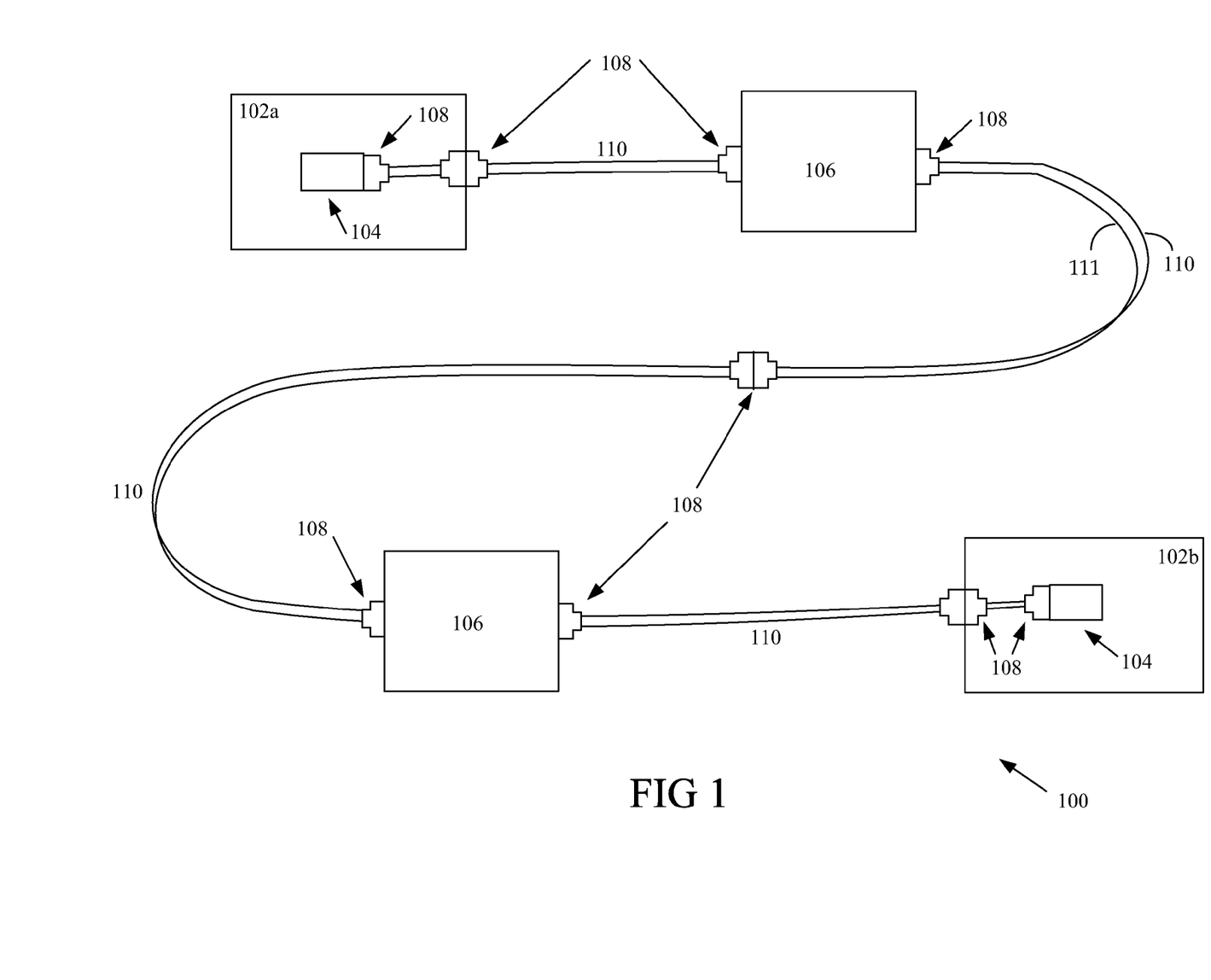
FIG. 1 depicts a two-fiber fiber optic link.

Referring to the drawings, FIG. 1 depicts a two-cable fiber optic network of the type generally used currently on aircraft, indicated by reference numeral 100. FIG. 1 is a simplified network only depicting two end systems 102 equipped with optical transceivers 104 as well as wiring integration panels 106. In practice, this network link can be between two systems, between two switches or between one end system and a switch. To best explain FIG. 1 consider the example of connecting the pilot communication system 102a and the flight recorder 102b, both of which are end systems 102. The pilot communication system 102a is equipped with a transceiver 104 and encompasses all flight deck audio equipment used by the pilots to communicate with air traffic control and pilot-to-pilot communications. The flight recorder 102b is equipped with an optical transceiver 104 that is configured to send and receive optically encoded information from the pilot communication system 102a as well as other avionic end systems, for example, engine telemetry systems, cabin pressurization systems, navigation systems, and other avionic systems to fully record the aircraft's history to assist in maintenance or for forensics in the event of an incident. Other end systems incorporating transceivers 104, as further described below, include, ports of network switches, computers, controllers, sensor devices, audio devices, and video devices. Connecting each end system to a wiring integration panel 106 and connecting each wiring integration panel 106 together forms the link communications connecting each end system. Should two segments of fiber optic cable 110, 111 need to be connected together, standard optical connectors 108 could be used per standard techniques known in the art. Furthermore, standard techniques are used to connect the fiber optical cable 110, 111 to the transceiver 104.

Due to an aircraft being sectionalized and all essential systems requiring redundancy, with redundant channels being separated by a safe distance, there exists multiple wiring integration panels for regrouping and rerouting the signals, and there exists multiple production breaks at the joint sections of the aircraft. The separate transmit fiber optic cable 110 and the receive fiber optic cable 111 therefore requiring twice as many optical termini as required by a single-fiber bidirectional link. For a communication channel with 10 in-line connectors, a dual-fiber bidirectional link would have 20 optical termini, whereas a single-fiber bidirectional link would only require 10 optical termini. The quantity of optical connectors is also reduced since there are now less optical termini which require optical connectors. In practice a typical aircraft would have multiple communication links between two systems to provide alternate paths for information to travel in case one path is faulty.

Figure 2:
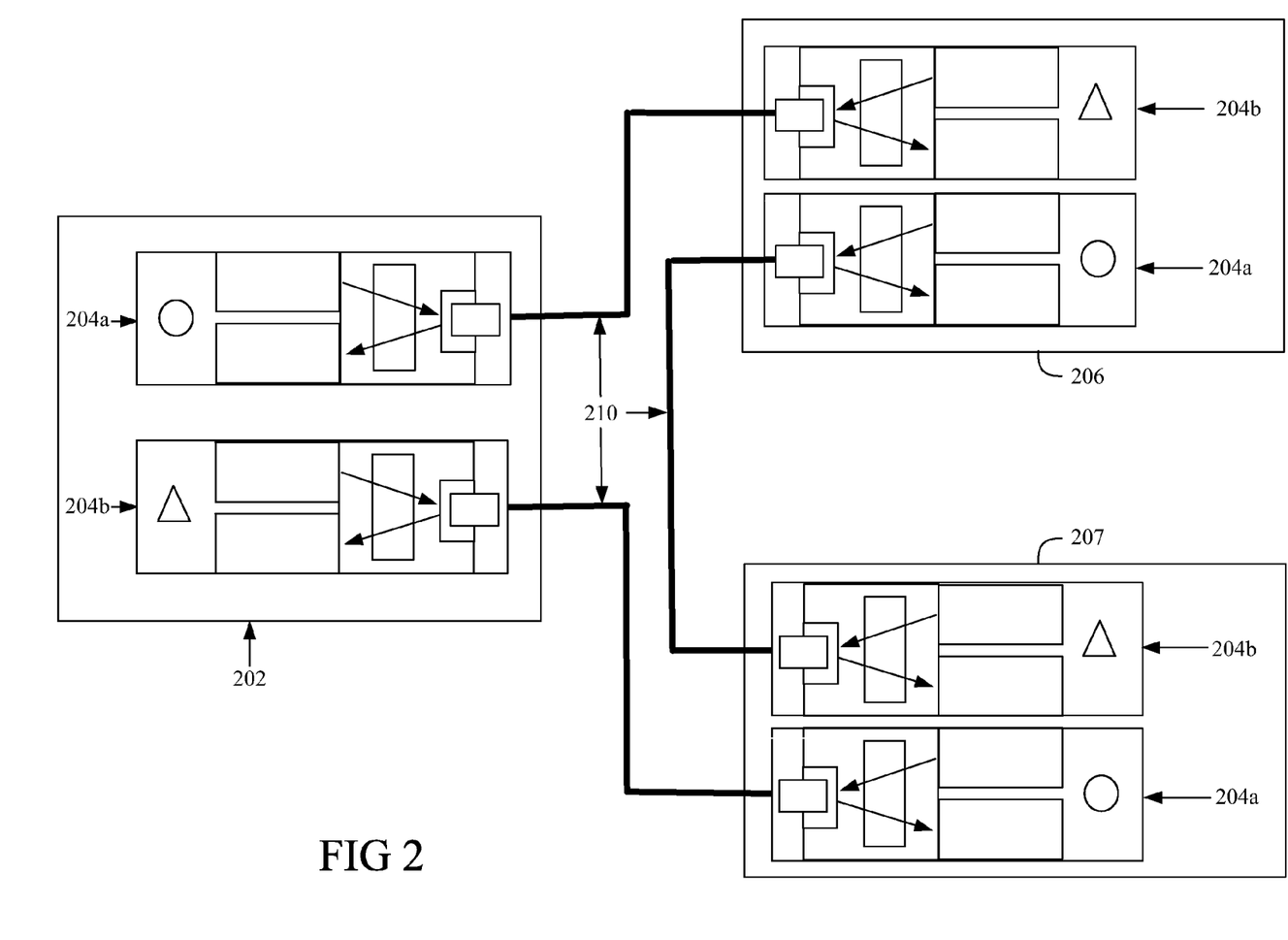
FIG. 2 depicts a dual-redundant switch-to-end user communication for a preferred embodiment.

FIG. 2 is a block diagram depicting a preferred multi-frequency bidirectional transceiver configuration for communication between an end user device 202 and switches 206 and 207 via a multimode fiber 210. End user device 202 is configured with two complimentary multi-frequency bidirectional transceivers 204a and 204b respectively. In a specific embodiment, the first multi-frequency bidirectional transceiver 204a transmits and receives laser light at wavelengths of 1550 nm and 1310 nm, respectively, and the second multi-frequency bidirectional transceiver 204b transmits and receives laser light at wavelengths of 1310 nm and 1550 nm, respectively. In the embodiment, utilization of multi-frequency bidirectional transceivers 204a and 204b allows for the utilization of multimode fiber 210.

Switches 206 and 207 are also configured with complimentary multi-frequency bidirectional transceivers 204a, 204b. As above, the first switch 206 is equipped with a bidirectional transceiver 204b configured to transmit and receive laser light at wavelengths of 1310 nm and 1550 nm, respectively. The second switch 207 is equipped with a multi-frequency bidirectional transceiver 204a configured to transmit and receive laser light at wavelengths of 1550 nm and 1310 nm, respectively. The switches 206 and 207 communicate with one another via a second set of multi-frequency bidirectional transceivers 204a, 204b. As illustrated, the switches 206 and 207, and the end user device 202 are connected via individual lengths of a single multimode fiber 210. In various embodiments and as further described below, by allocating various complimentary, bidirectional optical transceivers by transmission and reception wavelength, interoperability of redundant systems within a network can be ensured.

Using bidirectional transceivers such as 204a and 204b requires a balance on the number of transceivers operating at two independent wavelengths. There are a multitude of ways the transceivers could be balanced for use on an aircraft or other arenas including, but not limited to, naval vessels, rail equipment, or computer networks found in offices where redundancy may or may not be required. FIGS. 3, 4, 5, 6, and 7 depict various network embodiments. Note that in FIGS. 3, 4, 5, 6, and 7 the term "TX" refers to the transmit laser diode in a bidirectional transceiver and the term "RX" refers to the receive photodiode in a bidirectional transceiver.

Figure 3:
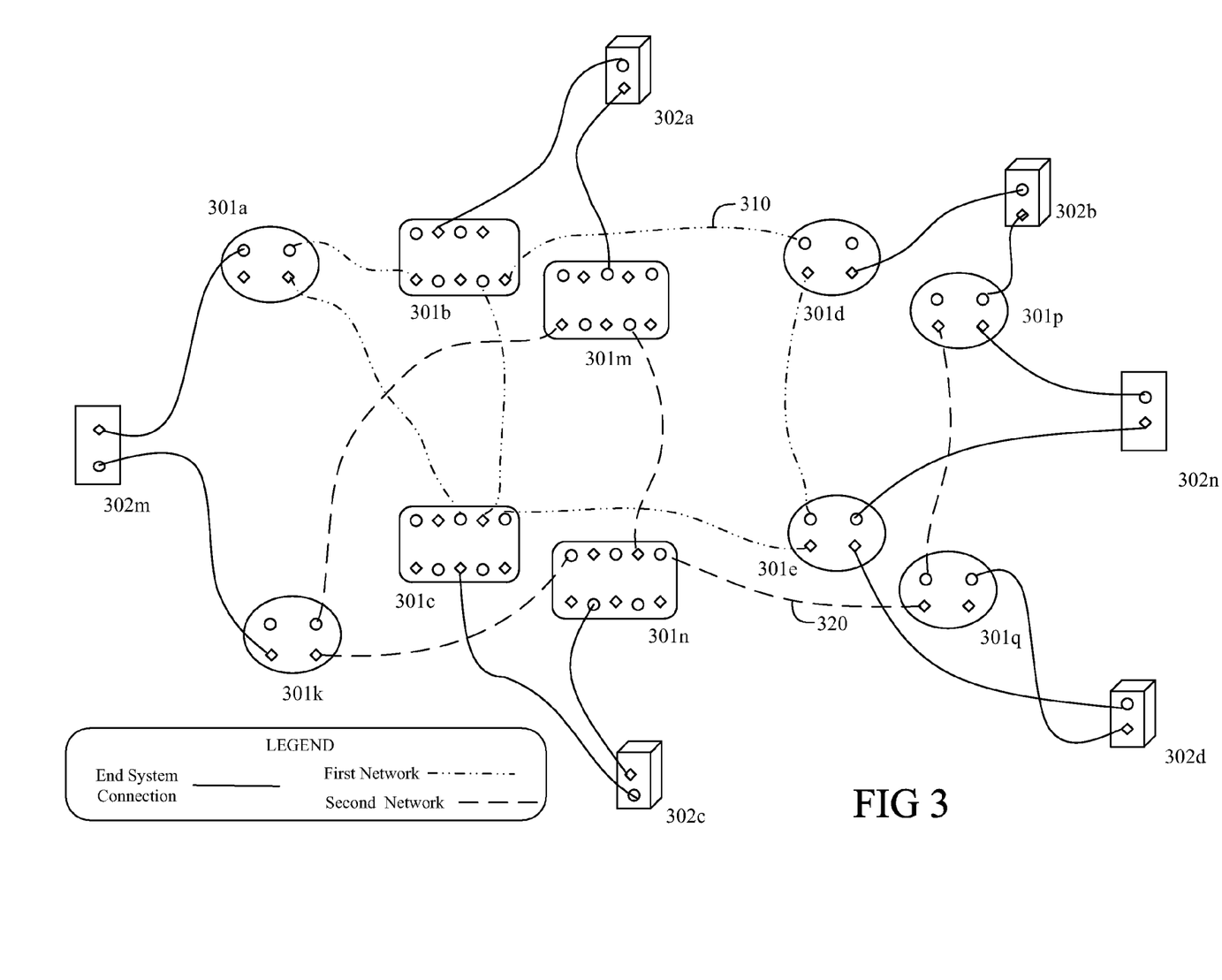
FIG. 3 depicts a method for allocating the dual wavelengths among the redundant network switches and redundant end systems.

FIG. 3 depicts the wavelength allocation logistic for redundant end systems and redundant switch networks. As illustrated in FIG. 3, and referring to the legend including in FIG. 3, a first switch network is formed by interconnecting network switches 301a, 301b, 301c, 301d, and 301e. The second switch network is formed by interconnecting network switches 301k, 301m, 301n, 301p, and 301q. In this illustration the switches 301b, 301c, 301m and 301n are switches that have ten ports whereas the remaining switches only have four ports. As indicated by the circles and diamonds within the network switches 301, each pair of ports corresponds to one pair of the above described multi-frequency bidirectional transceivers 204a, 204b. All of the end systems connecting to the first network 310, as indicated by the legend, can communicate with each others through one or more of the switches 301. All of the end systems connecting to the second network 320, also indicated by the legend, can communicate with each other. The two networks 310 and 320 are kept separate from each other both functionally and physically for safety and redundancy purposes.

The end systems 302m and 302n are dual redundant, that is systems 302m and 302n perform the same avionic function, as required by an essential avionic function such as the flight recorder function. The end systems 302a, 302b, 302c, and 302d are quad redundant as required by a critical avionic function such as the audio communication function. Each end system 302a, 302b, 302c, 302d, 302m and 302n is connected to both first and second networks, 310 and 320 respectively, through switches 301a, 301b, 301c, 301d, 301e, 301k, 301m, 301n, 301p, and 301q to provide redundant communication links. Each end system employs a pair of complimentary bidirectional transceivers 204 as described above and denoted by the circle and the diamond symbols in FIG. 3. In a specific embodiment, the circle represents a transceiver that transmits and receives at optical wavelengths 1550 nm and 1310 nm respectively and the diamond represents a transceiver that transmits and receives at optical wavelength 1310 nm and 1550 nm respectively.

The nature of dual wavelength communication on the same fiber requires that a circle must communicate to a diamond. The wavelength allocation is such that redundant end systems (the audio computers 302a, 302b, 302c, and 302d for instance) can be swapped among each other without reconfiguring the network. In one embodiment, a wavelength allocation algorithm begins by allocating transceivers (assigning communication links) from the switches to the critical end systems with quad redundant requirements first, then allocating transceivers to systems with triple redundant requirements, then allocations of transceivers to the essential users with dual redundant requirements, and finally allocating transceivers to the non-essential users with single end systems. This embodiment of wavelength allocation algorithm assures the interoperability of redundant systems and allows for an efficient utilization of all available complimentary transceiver pairs.

Figure 4:
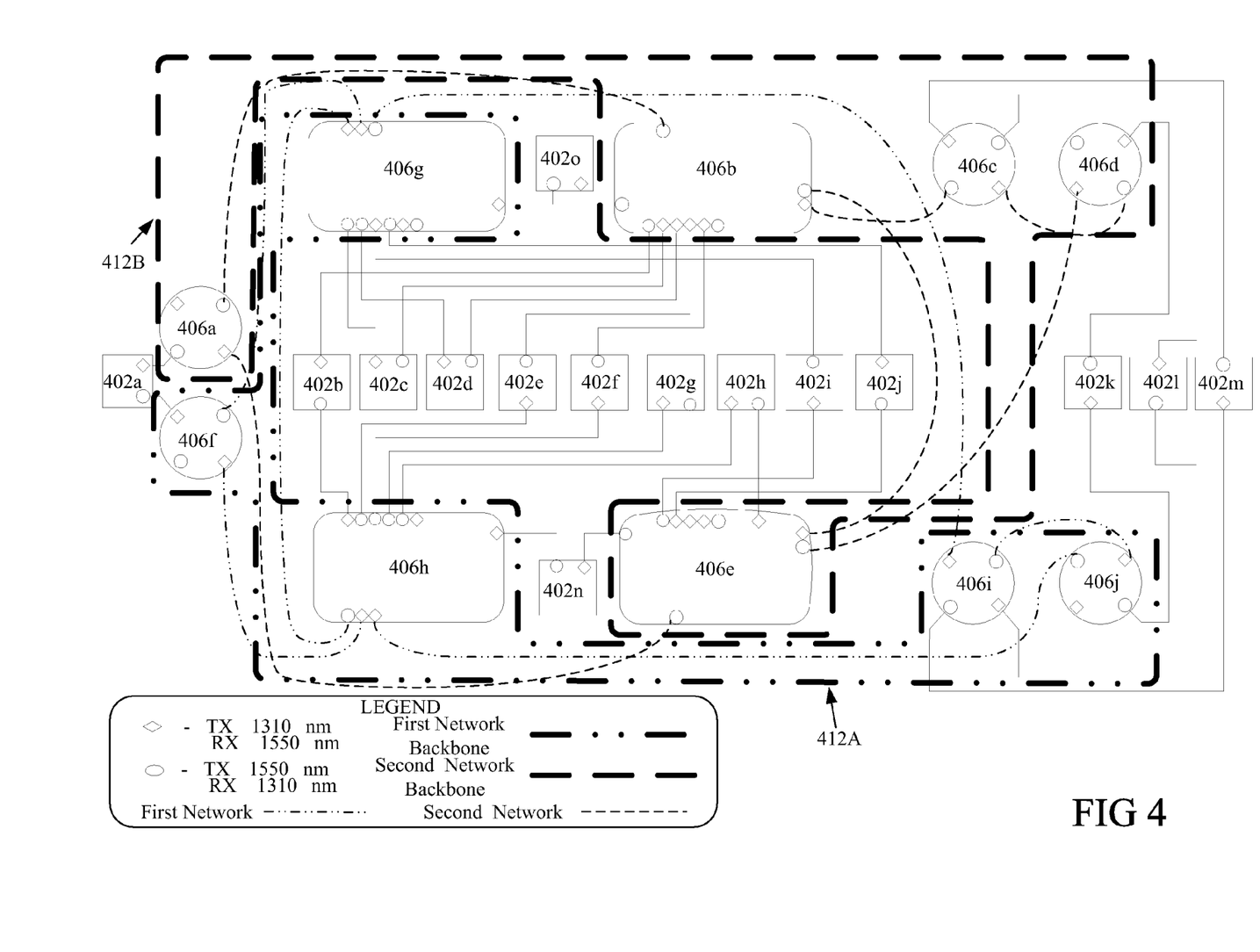
FIG. 4 depicts a preferred embodiment of a dual backbone fiber optic network.

In a preferred embodiment depicted in FIG. 4 each end systems 402a-402o is equipped with a complimentary pair of bidirectional transceivers 204 (shown in FIG. 2). A complimentary pair of bidirectional transceivers consists of one bidirectional transceiver that transmits a particular wavelength of laser light and receives a distinctly different wavelength of laser light and a second bidirectional transceiver that receives laser light at a wavelength equal to that of the wavelength of laser light the first bidirectional transceiver transmits and transmits laser light at the frequency the first bidirectional transceiver receives laser light. For example, if an end system 402 is equipped with a pair of bidirectional transceivers, the first bidirectional transceiver transmits and receives laser light at wavelengths of 1550 nm and 1310 nm, respectively, and the second bidirectional transceiver transmits and receives laser light at wavelengths of 1310 nm and 1550 nm, respectively. Each interconnected pair of bidirectional transceivers are complimentary.

The use of complimentary bidirectional transceivers allows for all the bidirectional transceivers to be useable regardless of the configuration by forming a First Network backbone 412A and a Second Network backbone 412B, as illustrated in FIG. 4. This architecture has scalability in that each system has ("n") number of complimentary pairs of bidirectional transceivers, where ("n") is a positive integer and depends on the amount of connectivity needs. The complimentary pair of bidirectional transceivers also enables loop around testing during development and/or manufacturing without depending on the destination system.

To illustrate the network depicted in FIG. 4 consider an aircraft network. The network is comprised of various end systems 402 found onboard an aircraft. More specifically, consider the pilot communication system 402a and the flight recorder 402m of an aircraft. During flight, the pilots communicate with one another, flight attendants, and air traffic control. The flight recorder 402b, in order to provide a complete picture of aircraft performance and history, records all of the communications as well as other aircraft telemetry (i.e. engine performance, aircraft control surface indicators, etc.).

First Network 412A and Second Network 412B are purposely kept separate from each other, i.e. there's no direct connection between any switch in First Network 412A and any switch in Second Network 412B so that failure of one network does not affect the other network. A single switch 406 within First Network 412A is connected to at least two separate switches 406 to provide multiple links for data to travel. Likewise, a single switch 406 within Second Network 412B is connected to at least two separate switches 406 to provide multiple links for data to travel. For example, switch 406a located within Second Network 412B is connected to switches 406b and 406e.

During flight, the pilot communication system 402a accepts input from the pilots and transfers the data via First Network 412A and Second Network 412B. The data will travel from the pilot communication system 402a via First Network 412A switches 406f, 406g, 406h, 406i, and 406j and in parallel via Second Network 412B switches 406a, 406b, 406c, 406d, and 406e to the flight recorder 402m. Because the networks are full duplex networks the end systems 402 and switches 406 can both send and receive data simultaneously. Should switch 406b malfunction or the fiber optic cable linking switches 406a and 406b become damaged in the first network, the same data will travel via switch 406e in the second network and service will not be interrupted.

The switch-to-switch communication requires that certain switches be equipped with a complimentary pair of bidirectional transceivers. For example, in the embodiment depicted in FIG. 4, switch 406h communicates with switch 406j by transmitting and receiving laser light at 1310 nm and 1550 nm, respectively. Switch 406h also communicates with switch 406f by transmitting and receiving laser light at 1550 nm and 1310 nm, respectively. It is contemplated that switch 406h could also communicate with switch 406f by transmitting and receiving laser light at 1310 nm and 1550 nm, respectively or any other wavelength pairs. The system designer and/or builder can select the choice of wavelength pairs for switch-to-switch communications. In the embodiment depicted in FIG. 4, an end user device 402 is connected to two switches 406.

Figure 5:
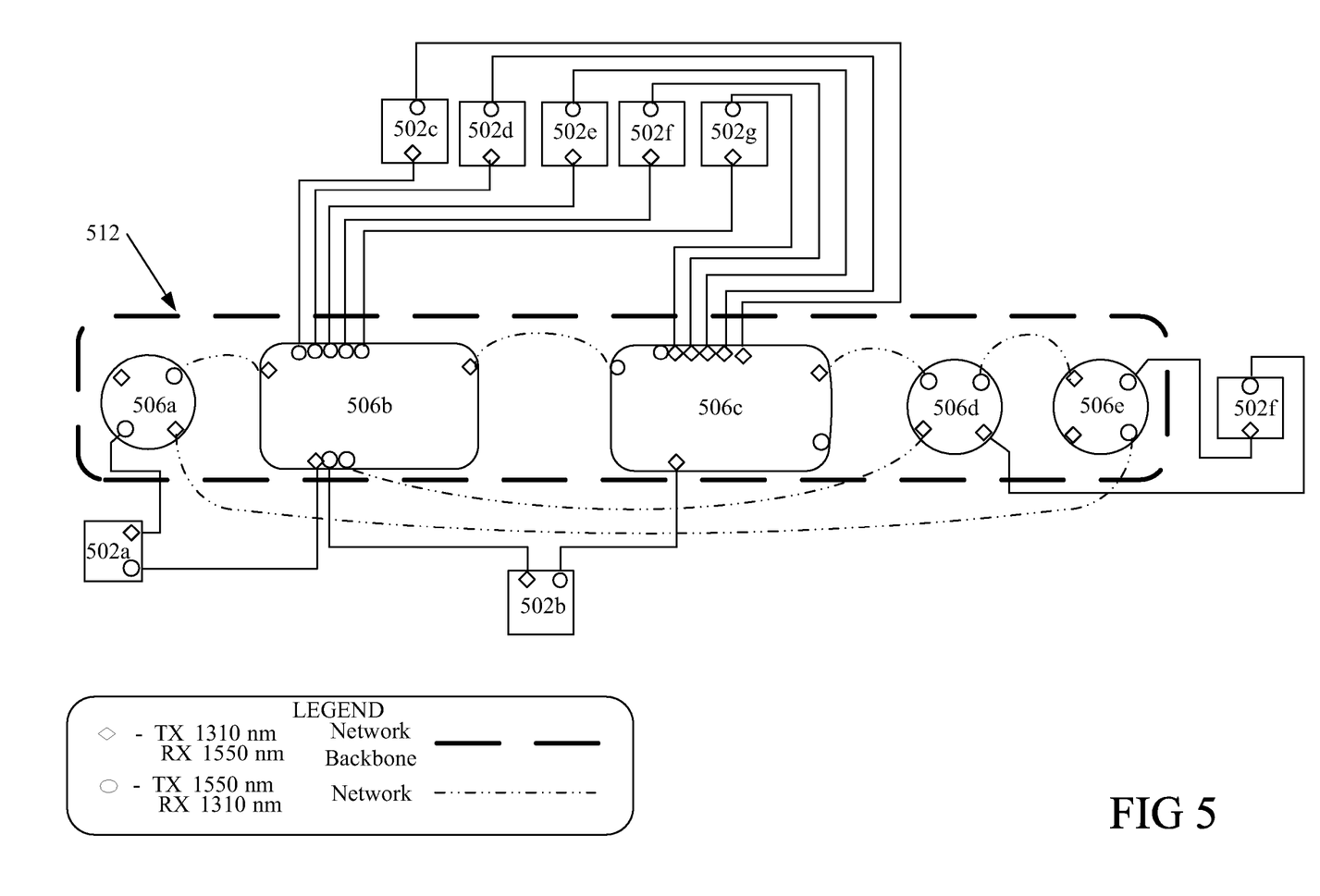
FIG. 5 depicts a preferred embodiment of single backbone fiber optic network.

FIG. 5 depicts a single backbone network implementing complimentary bidirectional transceivers. In FIG. 5 each end system 502 is equipped with a complimentary pair of bidirectional transceivers. A complimentary pair of bidirectional transceivers consists of one bidirectional transceiver that transmits a particular wavelength of laser light and receives a distinctly different wavelength of laser light and a second bidirectional transceiver that receives laser light at a wavelength equal to that of the wavelength of laser light the first bidirectional transceiver transmits and transmits laser light at the frequency the first bidirectional transceiver receives laser light. For example, if an end system is equipped with a pair bidirectional transceivers and the first bidirectional transceiver transmits and receives laser light at wavelengths of 1550 nm and 1310 nm, respectively, and the second bidirectional transceiver transmits and receives laser light at wavelengths of 1310 nm and 1550 nm, respectively. The pair of bidirectional transceivers are complimentary.

To implement the present invention, a system designer and/or integrator must label the ports of each switch 506 to ensure that an end system 502 is connected to two switches 506 having complimentary bidirectional transceiver to allow communications. For example, switch 506b has a majority of ports that transmit and receive laser light at 1550 nm and 1310 nm, respectively, and switch 506c has a majority of ports that transmit and receive laser light at 1310 nm and 1550 nm, respectively. The ports on both switch 506b and 506c have to be labeled accordingly so that when end system 502b is connected to the two switches 506b and 506c, the connections are not crossed and thereby cause communication failure between end system 502b and switches 506b and 506c.

To illustrate the network depicted in FIG. 5, consider a computer network comprised of various end systems 502 (i.e. computers, printers, servers, navigation and communication radios, etc.). More specifically, consider a desktop computer 502a and a printer 502f. The desktop computer 502a communicates with the printer 502f via switches 506 properly configured with bidirectional transceivers to allow the desktop computer 502a to communicate with two switches 502 simultaneously. Data will travel from the desktop computer 502a in parallel via network switches 506a, 506b, 506c, 506d, and 506e connected in parallel to form a network backbone 512. A single switch 506a is connected to two other switches 506b and 506e to provide multiple paths for data to travel should either switch 506b or 506e malfunction or the fiber optic cable connecting switches 506a, 506b, and 506e become damaged. The parallel connections provide redundancy within a single backbone network. Because the network is a full duplex network, the end systems 502 and switches 506 can both send and receive data simultaneously.

Figure 6:
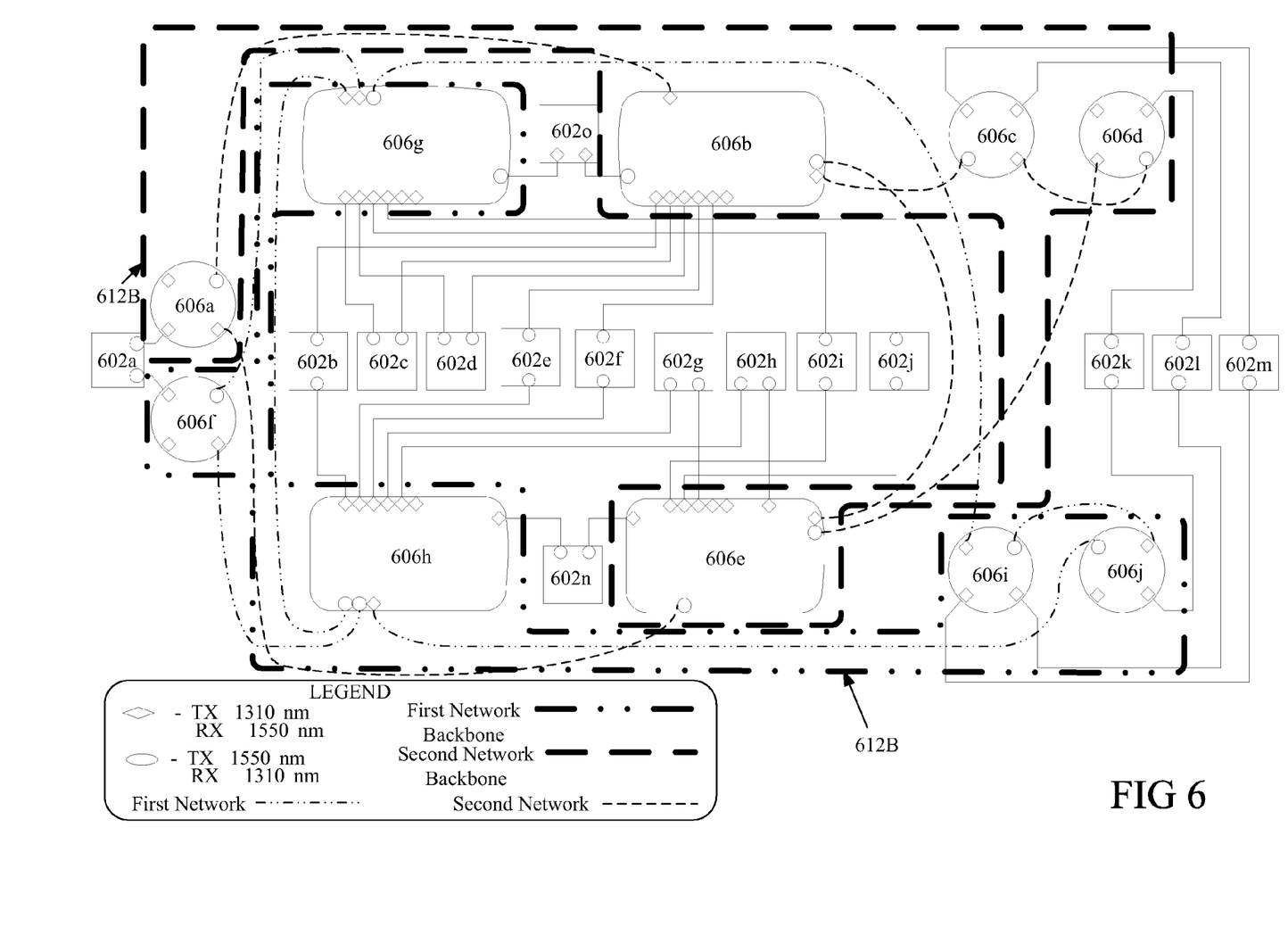
FIG. 6 depicts an alternate embodiment of a dual backbone fiber optic network.

FIG. 6 depicts an alternate embodiment of a multi-backbone network. Each end system 602 is equipped with bidirectional transceivers of the same type (i.e. non-complimentary) where the transmit frequencies are the same for both bidirectional transceivers and the complimentary bidirectional transceivers are located on the switches 606. The first and second bidirectional transceivers connected to an end system 602 transmit laser light at the same wavelength, and receive laser light at the other wavelength. The switches 606 that the end system 602 are connected to, transmit and receive laser light at the complimentary wavelengths. For example, the flight recorder 602m is equipped with two bidirectional transceivers. The first and second bidirectional transceivers connected to the flight recorder 602m transmit and receive laser light at wavelengths of 1550 nm and 1310 nm, respectively. The switches 606 that the flight recorder 602m is connected to, transmit and receive laser light at wavelengths of 1310 nm and 1550 nm, respectively.

First Network 612A and Second Network 612B are purposely kept separate from each other i.e. there's no direct connection between any switch in First Network 612A and any switch in Second Network 612B so that failure of one network does not affect the other network. A single switch 606 within First Network 612A is connected to at least two separate switches 606 to provide multiple links for data to travel. Likewise, a single switch 606 within Second Network 612B is connected to at least two separate switches 606 to provide multiple links for data to travel. For example, switch 606a located within Second Network 612B is connected to switches 606b and 606e.

In FIG. 6 First Network 612A and Second Network 612B implement bidirectional transceivers that transmit and receive laser light at wavelengths of 1550 nm and 1310 nm, respectively. The switches 606 on First Network 612A and Second Network 612B are receiving and transmitting laser light from the end systems 602 at wavelengths of 1550 nm and 1310 nm, respectively. The switch-to-switch communication requires that certain switches be equipped with a complimentary pair of bidirectional transceivers. For example, in the embodiment depicted in FIG. 6, switch 606h communicates with switch 606j by transmitting and receiving laser light at 1310 nm and 1550 nm, respectively. Switch 606h also communicates with switch 606f by transmitting and receiving laser light at 1550 nm and 1310 nm, respectively. It is contemplated that switch 606h could also communicate with switch 606f by transmitting and receiving laser light at 1310 nm and 1550 nm, respectively or other wavelength pairs. The system designer and/or builder can select the choice of wavelength pairs for switch-to-switch communications.

To illustrate the network depicted in FIG. 6 consider an aircraft network comprised of various end user devices 602. The network is comprised of various end systems 602 found onboard an aircraft. More specifically, consider the pilot communication system 602a and the flight recorder 602m of an aircraft. During flight the pilots communicate with one another, flight attendants, and air traffic control. The flight recorder 602b, in order to provide a complete picture of aircraft performance and history, records all of the communications as well as other aircraft telemetry (i.e. engine performance, aircraft control surface indicators, etc.).

For instance, during flight, the pilot communication system 602a accepts input from the pilots and transfers the data via First Network 612A and Second Network 612B. The data will travel from the pilot communication system 602a via First Network 612A switches 606f, 606g, 606h, 606i, and 606j and in parallel via Second Network 612B switches 606a, 606b, 606c, 606d, and 606e to the flight recorder 602m. Because the network is a full duplex network the end system 602 and switches 606 can both send and receive data simultaneously. Should switch 606b malfunction or the fiber optic cable linking switches 606a and 606b become damaged in the first network, data will travel via switch 606e in the second network and service will not be interrupted.

The advantage of the alternate embodiment is the simplicity in that all end systems 602 have bidirectional transceivers of the same type. This architecture does require that switches have an unbalanced number of bidirectional transceivers. An unbalanced number of bidirectional transceivers means that there will be more bidirectional transceivers operating at a given wavelength located on a given switch 606. For example, if a switch 606h has 10 total bidirectional transceivers and has two bidirectional transceivers transmit and receive laser light at wavelengths of 1550 nm and 1310 nm, respectively, and eight bidirectional transceivers transmit and receive laser light at wavelengths of 1310 nm and 1550 nm, respectively, then the switch 606h is unbalanced. In the embodiment depicted in FIG. 6, an end user device 602 is connected to two switches 606.

Figure 7:
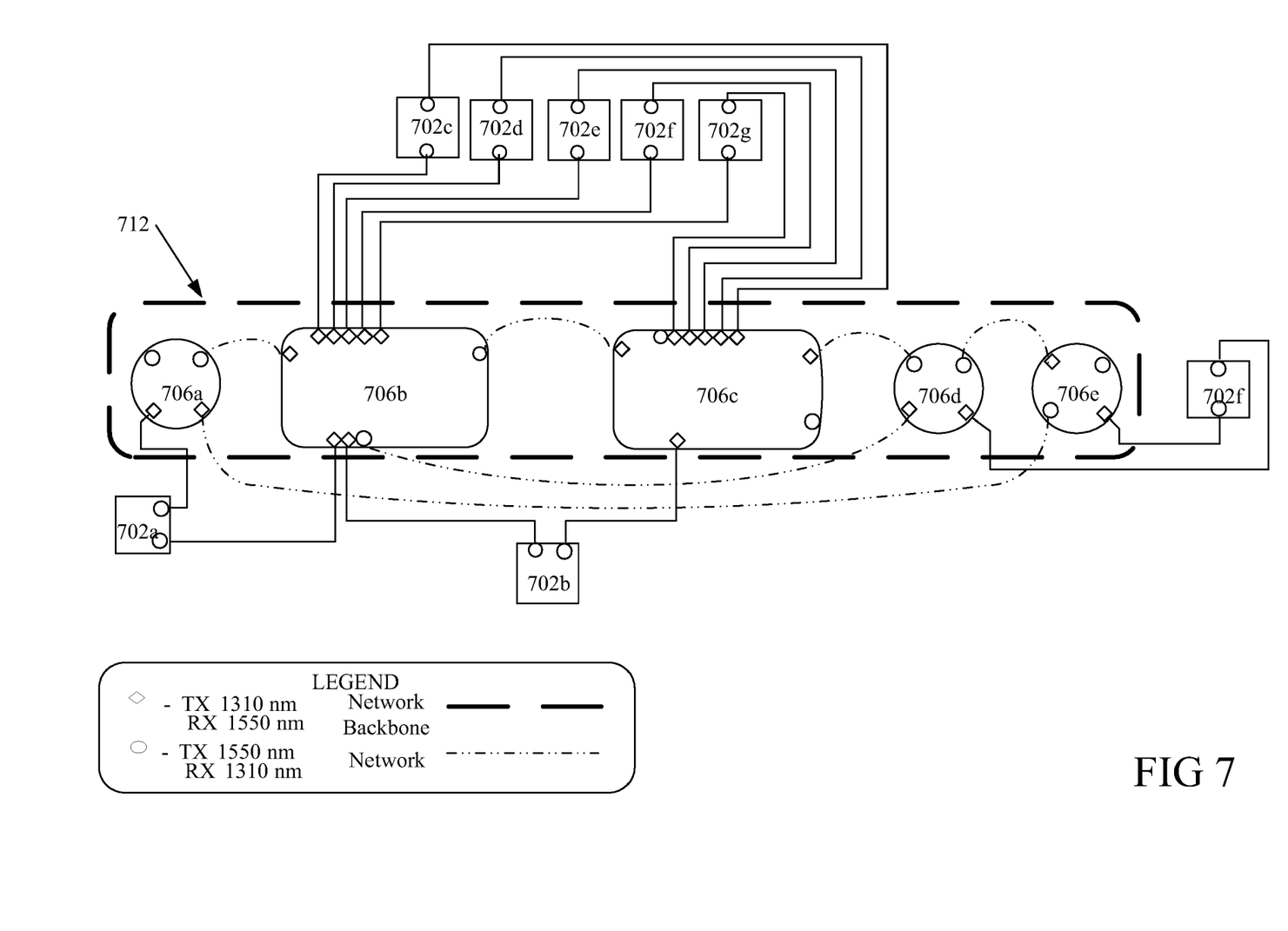
FIG. 7 depicts an alternate embodiment of a single backbone fiber optic network.

FIG. 7 depicts an alternate embodiment of a single-backbone network. Each end system 702 is equipped with bidirectional transceivers of the same type where the transmit frequencies are the same for both bidirectional transceivers and the complimentary bidirectional transceivers are located on the switches 706. For example, in FIG. 7 the end systems 702 implement bidirectional transceivers that transmit and receive laser light at wavelengths of 1550 nm and 1310 nm, respectively. The switches 706 on the network are receiving and transmitting laser light at wavelengths of 1550 nm and 1310 nm, respectively. The switch-to-switch communication requires that the switch 706 be equipped with a complimentary pair of bidirectional transceivers.

To illustrate the network depicted in FIG. 7 consider a computer network comprised of various end user devices 702 (i.e. computers, printers, navigation and communication radios etc.). More specifically, consider a desktop computer 702a and a printer 702f. The desktop computer 702a communicates with the printer 702f via switches 706 properly configured with bidirectional transceivers to allow the desktop computer 702a to communicate with two switches 702 simultaneously. Data will travel from the desktop computer 702a in parallel via network switches 706a, 706b, 706c, 706d, and 706e connected in parallel to form a network backbone 712. A single switch 706a is connected to two other switches 706b and 706e to provide multiple paths for data to travel should either switch 706b or 706e malfunction or the fiber optic cable connecting the switches 706a, 706b, and 706e become damaged. The parallel connections provide redundancy within a single backbone network. Because the network is a full duplex network, the end systems 702 and switches 706 can both send and receive data simultaneously.

The advantage of the alternate embodiment is the simplicity in that all end systems 702 have bidirectional transceivers of the same type. This architecture does require that switches have an unbalanced number of bidirectional transceivers. An unbalanced number of bidirectional transceivers means that there will be more bidirectional transceivers operating at a given wavelength located on a given switch 706. For example, if a switch 706h has 10 total bidirectional transceivers and has two bidirectional transceivers that transmit and receive laser light at wavelengths of 1550 nm and 1310 nm, respectively, and eight bidirectional transceivers that transmit and receive laser light at wavelengths of 1310 nm and 1550 nm, respectively, then the switch 706h is unbalanced.

While single-backbone and two-backbone networks are described herein, it is contemplated that one skilled in the arts could create a network of more than two backbones using the methods and systems described herein. It is contemplated that wavelength pairs other than of 1550 nm and 1310 nm could be implemented. It is further contemplated that each end system could be equipped with bidirectional transceivers having various wavelength pairs. In addition, these wavelength pairs could be used to identify a particular end system. For example, each individual computer within a computer network could have a wavelength pair that is different from other computers on the network and the wavelength pair could serve as a "signature" to distinguish that particular computer from other computers on the network or identify a particular computer to a server. While the disclosure depicts end systems connected to two switches, it is contemplated that an end system may only be connected to a single switch or more than two switches.

While FIGS. 3, 4, 5, 6, and 7 depict four-port and ten-port switches, it is contemplated that switches having various port configurations can be used and that a ten-port switches can be replaced with switches of fewer ports or multiple four-ports switches can be combined into a single switch having a port capacity equal to or greater than the sum of the ports of the combined switches. For example, in FIG. 5 switches 506d and 506e could be replaced with a ten-port switch similar to that of switch 506c. Furthermore, switch 506c could be replaced with three switches similar to that of switch 506d.

Until the herein described embodiments, it has not been contemplated that COTS bidirectional transceivers designed for single-mode fiber optic cable could be used for multimode fiber optic cable applications due to possible destructive interference of different propagation modes of light inside the multimode fiber optic cable, especially fiber optic cable with many production breaks (inline connectors) such as on aircraft. However, extensive analysis and testing leading to the disclosure herein has established that short length multimode fiber optic cable typically used in aircraft platforms can be connected to certain types of multi-frequency bidirectional transceivers using standard equipment and techniques. The desirable types of transceivers utilize multi-frequency lasers which happen to be the least expensive and most common type of lasers on the market. VCSEL (Vertical Cavity Surface Emitting Laser) and FP (Fabry Perot) are long established and economical lasers. The current embodiments have been tested for distances up to 200 m. For use in an aircraft environment, 200 m is approximately double the length of the longest fiber optic cable segment implemented.

Also, until the herein described embodiments, it has not been contemplated that a complex fiber optic network could be realized having built-in redundancy not only for network components (cabling, switches, end systems & transceivers), but also accommodating the rules of physical separation required for critical systems on aircraft that utilize a single fiber optic cable link with dual optical wavelengths that can address multi-vendor interoperability of multiple redundant end systems. From a systems level, redundant computers with the same functionality are supposed to transmit and receive from redundant network switches in such a manner that any of these computers can be swapped among each other without the need for system reconfiguration.

Finally, the herein described embodiments, circumvent at least some of the above described problems in the prior art by successfully architecture of a dual wavelength communications link on a single fiber optic cable. The dual wavelength communications link serves as the fundamental building block for allocating network links among redundant network switches and end systems. By clever allocation of the transmission and receiving wavelengths to the data network links and by selecting the correct type of laser transceiver, and fiber optic cable, the above described embodiments have made practical wavelength division multiplexing on aircraft redundant switch networks and provides significant savings in part cost, fabrication, assembly, handling, inventory, installation, inspection, and maintenance.

While the invention has been described in terms of various specific embodiments, those skilled in the art will recognize that the invention can be practiced with modification within the spirit and scope of the claims.

What is claimed is:

1. A network for providing redundant, full duplex, communications, said network comprising:
   a first network end device;
   a second network end device;
   a plurality of complimentary, bi-directional, transceiver pairs, a first said transceiver pair communicatively coupled respectively to said first and said second network end devices to form a first separate network portion, a second said transceiver pair also communicatively coupled respectively to said first and said second network end devices to form a second separate network portion, said transceiver pairs configured for single mode operation, and allocated to said network end devices by transmission and reception wavelength to assure interoperability of redundant systems within said network; and a plurality of multimode optical fibers optically coupled to said transceiver pairs to provide the communicative coupling therebetween, each said multimode optical fiber configured for full duplex communication, each said multimode optical fiber forming at least a portion of a separate network portion between respective said transceiver pairs.

2. A network according to claim 1 wherein said network end devices comprise at least one of an avionic system, a port of a network switch, a computer, a controller, a sensor device, an audio device, and a video device.

3. A network according to claim 1 wherein for each pair of said transceivers, a first transceiver is configured to transmit at a first wavelength and receive at a second wavelength and a second transceiver is configured to transmit at the second wavelength and receive at the first wavelength.

4. A network according to claim 1 wherein each said transceiver comprises a laser diode operable to output multiple frequencies within a spectrum that includes a nominal center wavelength.

5. A network according to claim 1 further comprising a plurality of network switches, each said network switch comprising a portion of said plurality of complimentary, bi-directional, transceiver pairs, each said switch communicatively coupled to at least two other said switches, using a portion of said multimode optical fibers to form a separate network portion.

6. A network according to claim 5 wherein to provide redundancy, the separate network portions are separated logically and physically from one another to provide a redundant network.

7. A network according to claim 5 wherein each said network end device comprises two of said transceivers, a first said transceiver communicatively coupled to a first separate network portion, a second said transceiver communicatively coupled to a second said network portion.

8. A network according to claim 1 further comprising a plurality of network switches, each said network switch comprising a portion of said plurality of complimentary, bi-directional, transceiver pairs, each said switch communicatively coupled to at least two other said switches, portions of said multimode optical fibers, said transceiver pairs, and said network switches forming a network backbone for a plurality of network end devices.

9. A network according to claim 1 wherein each said transceiver comprises a laser diode operable to output multiple frequencies, said laser diodes comprising at least one of a Fabry Perot multiple frequency laser diode and a vertical cavity surface emitting laser multiple frequency laser diode.

10. A network according to claim 1 wherein said first and said second network end devices provide a redundant function, said network configured such that said first and said second network end devices are interchangeable.

11. A network according to claim 1 wherein said transceiver pairs are configured for operation with a single mode optical fiber.

12. A method for fabricating a full duplex, redundant optical network, said method comprising:

providing a plurality of network end devices, each network end device having a pair of complimentary, bidirectional optical transceivers;

connecting, using multimode fiber optic cable, the transceivers of each network end device to separate network switches, each network switch configured with at least one pair of complimentary, bidirectional optical transceivers;

allocating wavelengths of the complimentary, bidirectional optical transceivers to the end devices to assure interoperability of redundant systems within the network; and interconnecting, using multimode fiber optic cable, at least a portion of the non-connected transceivers in the network switches, to provide at least two separate, redundant networks for communications between the network end devices.

13. A method according to claim 12 further comprising providing a plurality of complimentary, bidirectional optical transceiver pairs where a first transceiver of each pair is configured to transmit at a first wavelength and receive at a second wavelength and a second transceiver of each pair is configured to transmit at the second wavelength and receive at the first wavelength.

14. A method according to claim 12 further comprising providing a plurality of complimentary, bidirectional optical transceiver pairs where each transceiver includes a laser diode operable to output multiple frequencies within a spectrum that includes a nominal center wavelength.

15. A method according to claim 12 wherein interconnecting at least a portion of the non-connected transceivers in the network switches further comprises communicatively coupling the network switches, using complimentary bidirectional optical transceivers, to at least two other network switches to form a separate network portion.

16. A method according to claim 15 wherein interconnecting at least a portion of the non-connected transceivers in the network switches, to provide at least two separate, redundant networks comprises separating logically and physically the separate network portions.

17. A method according to claim 15 wherein connecting the transceivers of each network end device to separate network switches comprises:

communicatively coupling a first transceiver of the network end device to a first separate network portion; and communicatively coupling a second transceiver of the network end device to a second separate network portion.

18. A method according to claim 15 further comprising forming a network backbone for a plurality of network end devices utilizing the separate network portions.

19. An optical network backbone comprising:

a plurality of multimode optical fibers; and a plurality of network switches, each said network switch comprising a plurality of bi-directional, transceivers, at least one of said transceivers in each said network switch operable for bi-directional communication with a network end device, at least one of said transceivers operable for bi-directional communication with another of said network switches, each said transceiver operable to transmit at a first wavelength and receive at a second wavelength, said transceivers are allocated by transmission and reception wavelengths to ensure interoperability of redundant systems of said network end devices.

20. An optical network backbone according to claim 19 wherein said transceivers are configured for operation with a single mode optical fiber.

21. An optical network backbone according to claim 19 wherein each said network switch is optically connected to at least two other of said switches within said network backbone.

22. An optical communications network comprising:
a plurality of network end devices, a portion of said devices configured to operate as redundant systems, each said network end device comprising a bi-directional optical transceiver configured to transmit at a first wavelength and receive at a second wavelength, said transceivers configured for single mode operation;
a plurality of network switches, each said network switch comprising a bi-directional optical transceiver configured to transmit at a first wavelength and receive at a second wavelength, said transceivers configured for single mode operation; and
a plurality of multimode optical fibers configured for full duplex communication, a portion of said optical fibers optically coupling a portion of said network switches to said network end devices, a portion of said optical fibers optically coupling a portion of said network switches to one another, said bi-directional optical transceivers allocated by transmission and reception wavelengths to ensure interoperability of redundant systems of said network end devices.

* * * * *